US008325082B2

(12) United States Patent
Rudnisky et al.

(10) Patent No.: US 8,325,082 B2
(45) Date of Patent: Dec. 4, 2012

(54) PREDICTIVE AND ADAPTIVE WIDE AREA SURVEILLANCE

(75) Inventors: William Rudnisky, Los Angeles, CA (US); Guillermo Jimenez, Lake Forest, CA (US); James J. Hiroshige, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 217 days.

(21) Appl. No.: 12/873,208

(22) Filed: Aug. 31, 2010

(65) Prior Publication Data

US 2012/0050090 A1    Mar. 1, 2012

(51) Int. Cl.
*G01S 13/00* (2006.01)

(52) U.S. Cl. ............. 342/73; 342/74; 342/147; 342/158

(58) Field of Classification Search ............. 342/73–103
See application file for complete search history.

(56) References Cited

U.S. PATENT DOCUMENTS

| | | | | |
|---|---|---|---|---|
| 4,720,711 A * | 1/1988 | Quesinberry et al. | .......... | 342/96 |
| 4,845,500 A * | 7/1989 | Cornett et al. | .................. | 342/90 |
| 5,793,931 A * | 8/1998 | Hillis | .............................. | 706/13 |
| 6,055,523 A * | 4/2000 | Hillis | .............................. | 706/13 |
| 6,512,476 B1 * | 1/2003 | Woodell | ...................... | 342/26 B |
| 6,677,890 B2 * | 1/2004 | Halsey et al. | .................. | 342/74 |
| 6,690,318 B1 * | 2/2004 | Tsunoda | ........................ | 342/59 |
| 6,859,161 B1 * | 2/2005 | Bricker et al. | ................. | 342/13 |
| 6,888,493 B2 * | 5/2005 | Driessen et al. | ................ | 342/91 |
| 7,038,611 B2 * | 5/2006 | Gounalis | ........................ | 342/13 |
| 7,193,555 B2 * | 3/2007 | Gounalis | ........................ | 342/13 |
| 7,298,316 B2 * | 11/2007 | Tsai et al. | ...................... | 342/159 |
| 7,358,887 B2 * | 4/2008 | Gounalis | ........................ | 342/20 |
| 2004/0027274 A1 * | 2/2004 | Driessen et al. | ................ | 342/91 |
| 2004/0133380 A1 * | 7/2004 | Gounalis | ....................... | 702/127 |
| 2004/0135717 A1 * | 7/2004 | Gounalis | ........................ | 342/13 |
| 2005/0052312 A1 * | 3/2005 | Bricker et al. | .................. | 342/13 |

(Continued)

FOREIGN PATENT DOCUMENTS

EP    1 351 069 A1    10/2003

OTHER PUBLICATIONS

Extended European Search Report for European Application No. 11150720.8, Applicant Raytheon Company, European Search Report dated May 30, 2011 and mailed Jun. 14, 2011 (6 pgs.).

(Continued)

*Primary Examiner* — Jack W Keith
*Assistant Examiner* — Peter Bythrow
(74) *Attorney, Agent, or Firm* — Christie, Parker & Hale, LLP

(57) ABSTRACT

A device and method for wide area surveillance of a geographic region includes identifying a search space associated with a geographic region having a plurality of sub-regions. The search space is divided into a plurality of search cells and observation data is collected for each of the plurality of search cells based on a scan of the geographic region. An event generation rate is calculated for each of the search cells based on the collected observation data. One or more of the sub-regions are identified as a region(s) of interest based on the calculated event generation rates. A coverage pattern is estimated for each of the sub-regions and a desired revisit rate is calculated for the region of interest based on the estimated coverage pattern. The desired revisit rate is then output for scanning the region of interest.

20 Claims, 9 Drawing Sheets

U.S. PATENT DOCUMENTS

| | | | |
|---|---|---|---|
| 2005/0195104 A1* | 9/2005 | Liebscher et al. | 342/191 |
| 2006/0097904 A1* | 5/2006 | Gounalis | 342/13 |
| 2006/0097910 A1* | 5/2006 | Collins et al. | 342/160 |
| 2006/0152405 A1* | 7/2006 | Egri et al. | 342/70 |
| 2006/0238403 A1* | 10/2006 | Golan et al. | 342/62 |
| 2007/0139258 A1* | 6/2007 | Tsai et al. | 342/159 |
| 2009/0058713 A1* | 3/2009 | Okunishi et al. | 342/91 |
| 2009/0109082 A1* | 4/2009 | Rose | 342/89 |
| 2010/0149338 A1* | 6/2010 | Aggarwal et al. | 348/159 |

OTHER PUBLICATIONS

Collins, G. et al; An Entropy-based Approach to Wide Area Surveillance, Apr. 2006; 14 pages; Toyon Research Corporation, Goleta, CA.

Schmaedeke, W.; Information Based Sensor Management; downloaded from SPIE Digital Library Jun. 21, 2010; 9 pages; SPIE vol. 1955 (156-164); Paramax Systems Corporation, Eagan, MN.

* cited by examiner

PREDICTIVE AND ADAPTIVE WIDE AREA SURVEILLANCE

FIELD OF THE INVENTION

This invention relates generally to surveillance systems, and more particularly, to a system and method for autonomous wide area surveillance that reduces data loads and focuses the surveillance on information rich regions.

BACKGROUND OF THE INVENTION

Current methodology used to gather information during wide area surveillance includes performing a raster scan of a geographic area which is the subject of surveillance. Certain sub-regions of interest are then manually selected by an operator, and revisit rates are also manually assigned in order to re-scan the selected sub-regions at the identified revisit rates. Such surveillance methodology, however, can lead to inefficient time line usage and the production of a large amount of unnecessary data.

Accordingly, what is desired is a system and method for wide area surveillance that reduces the time spent collecting unnecessary or redundant data, and improves data collection within regions of interest. Such a system and method should be autonomous and not require operator intervention in order to designate revisit rates for sub-regions of interest.

SUMMARY OF THE INVENTION

According to one embodiment, the present invention is directed to a device and method for wide area surveillance of a geographic region. The device includes a processor and an electronic storage device including program instructions that are executed by the processor. According to the program instructions, a search space associated with a geographic region having a plurality of sub-regions is identified. The search space is divided into a plurality of search cells and observation data is collected for each of the plurality of search cells based on a scan of the geographic region. An event generation rate is calculated for each of the search cells based on the collected observation data. One or more of the sub-regions is identified as one or more regions of interest based on the calculated event generation rates. A coverage pattern is estimated for each of the one or more regions of interest and a desired revisit rate is calculated for each of the regions based on the estimated coverage pattern. The desired revisit rate is then output for scanning the corresponding region of interest.

According to one embodiment of the invention, the coverage pattern defines geometries of the scan for each of the one or more regions of interest.

According to one embodiment of the invention, the desired revisit rate includes a desired percentage of an available search time dedicated by a radar for scanning the corresponding region of interest. The desired percentage may be based on a percentage of events likely to occur in the corresponding region of interest during a period. The desired revisit rate may increase as the percentage of events likely to occur increases.

According to one embodiment of the invention, calculating the desired revisit rate includes calculating a scan efficiency for the corresponding region of interest.

According to one embodiment of the invention, the observation data includes a number of events observed for each of the search cells.

According to one embodiment of the invention, the event generation rate is weighted average of events weighted by time between observations.

According to one embodiment of the invention, identifying the one or more sub-regions as one or more regions of interest includes filtering the plurality of search cells based on the event generation rates, and clustering one or more of the search cells with event generation rates above a set minimum threshold.

According to one embodiment of the invention, a change of the region is detected and a new scan of the geographic region is invoked based on the detected change.

According to one embodiment of the invention, the event generation rates are stored as a matrix, and the matrix of event generation rate values are then converted into an image.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to a system and method for autonomous wide area surveillance (AWAS) which combines real time adaptive sensor management with closed loop techniques to reduce data loads and to focus on information rich regions. In this regard, the AWAS system considers an entire geographic area designated for wide area search as a raster image, and subdivides the search volume into discrete search cells. An observation history can then be collected for each search cell. In this regard, the AWAS system receives an event of interest including forensic or situational data, as an observation. The event may relate to an object of a particular type (e.g. a truck, tank, missile, etc.) or may be a status change of a track. For example, a track sink (death) and source (confirmation) may be an observable event of interest. In other examples, the event may be targets circling a block, a target type identification, or the like. According to one embodiment, the specific events of interest are defined via user input.

According to one embodiment of the invention, the AWAS system determines the number of tracks generated per unit time, models track generation as a Poisson process, and calculates a track flux rate within each cell. According to one embodiment, the flux rate represents a score for the search cell. After scoring the cells, the images are input through one or more filters. The scoring and filtering results in regional trends being lumped together. The regional trends then become regions of interest (ROI) and are assigned a higher revisit rate. A revisit rate determines how often a particular region is to be revisited for performing a scan of that region. Characteristics of each region are gathered through converting the raw filtered data into a grayscale image, and eventually to binary (black and white). When the regions are identified, they are ranked according to their activity level, with higher activity levels receiving a higher ranking. The AWAS system then selects a coverage pattern and determines the least amount of sensor jobs necessary to cover all the regions. The system predicts the number of track starts since each area was last scanned, and estimates the scan time for each sub-region. This ratio is utilized by a resource management scheme to select the next region to scan. The system tracks this score and selects the region with the highest benefit to cost ratio. If the track generation begins to slow in a region, the score automatically adjusts over time and the area drops in priority.

Figure 1:
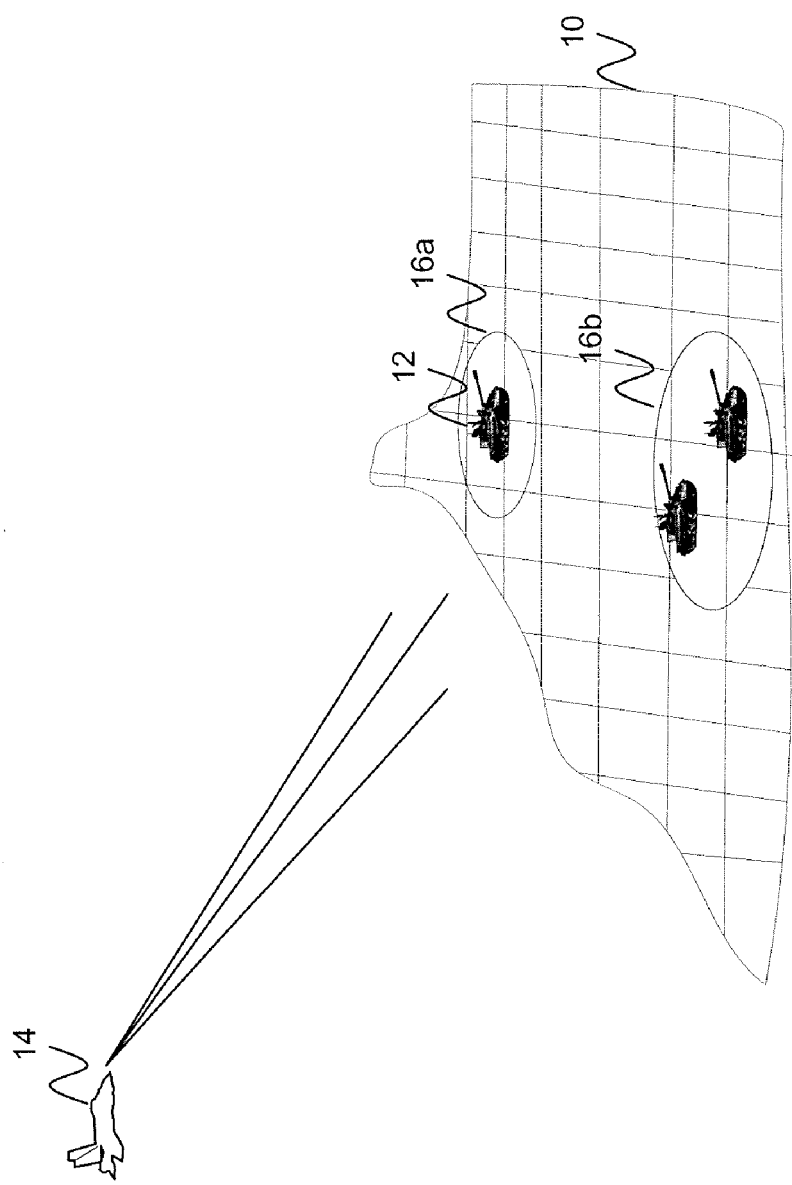
FIG. 1 is a schematic diagram of a surveillance geographic area with numerous targets generating tracks or other activities or events of interest.

FIG. 1 is a schematic diagram of a surveillance geographic area 10 with numerous targets 12 generating tracks or other activities or events of interest. The activities or events of interest are detected by a sensor, radar, or any detection device (collectively referred to as a radar or front end) installed or operated in an aerial device 14 that is conducting surveillance of the geographic area. Such activities or events of interest include kinematic, forensic, and situational data. According to one embodiment, a user input (e.g. keyboard, keypad, touch-screen, etc.) coupled to the radar allows an operator to specify the types of activities or events that are of interest. Although an aerial device is contemplated to include the radar for conducting surveillance of a geographic area, a person of skill in the art should recognize that surveillance may also be conducted by tethered balloons, one or several UAV's (unmanned air vehicles), or any airborne Intelligence, Surveillance, Reconnaissance (ISR) platform.

A computing device integral with the radar or separate from the radar runs an intelligent search algorithm for isolating regions of high activity and assigning a coverage pattern to maximize sensor efficiency in regional coverage. According to another embodiment, distributed radars may collect activity information and forward the collected information to a central radar or computing device for processing (also referred to as a sensor manager). Regardless of the embodiment used, the computing device executes computer program instructions stored in memory to implement the intelligent search algorithm described herein. In this regard, the computing device divides the surveillance area, also referred to as the search volume, into cells spanning, for example, 1 arc minute each. The computing device records observed events in the cells. Such observations may be provided by a single sensor, a plurality of distributed sensors, or the like. For example, the computing device may record movement of the targets 12 or other forensic and situational data. Because the surveillance area is divided into discrete search cells, individual values may be assigned to each search cell based on the observed events. According to one embodiment, the computing device assigns a kinetic value to each cell based on forensic and situational history data averaged over time.

A clustering algorithm is then invoked to aggregate higher scoring cells into clusters referred to as regions of interest (ROIs) 16a, 16b (collectively referred to as 16). The ROIs are then assigned a higher revisit rate. In this regard, the computing device automatically adapts the sensor coverage pattern to focus the search on information rich regions (i.e. the ROIs) to trigger more robust track generation while minimizing over-collection of useless information. Unlike in the prior art when the operator of the aerial device manually identified a region of interest and manually determined a revisit rate for such region of interest, both the region of interest identification and revisit rate designation occur automatically according to embodiments of the present invention.

Embodiments of the present invention allow histories of data obtained through cell visits to be accurately kept for each true location on the ground. Over time, trends emerge and given appropriate conditions, the algorithm can self select a coverage pattern to improve search metrics for detecting events of interest.

According to one embodiment, after a series of initial raster scans of a surveillance region is performed, the intelligent search algorithm selects one or more regions of interest for a more focused search. Using image processing techniques, the algorithm provides an adaptable method to produce ROIs based on any particular metric of interest. The intensity of the entire search-space raster image is filtered, with some highest scoring cells receiving a ROI designation. According to one embodiment, a percentage of coverage area allowable for ROI designation is 10%, but this number may be either a user input value, or flexible if a certain sub-set of cells have a higher score, prompting a relative threshold calculation.

According to one embodiment, the criteria for determining when to revisit a ROI as opposed to conducting a raster scan of the entire search area is the estimated benefit versus the known cost, commonly referred to as an objective function. According to one embodiment, the cost is the time required to scan the ROI, while the benefit can either be considered the likelihood of an event of interest (EOI) occurring, or an improvement to current track knowledge. The revisit criteria developed weighs these factors on a case by case basis, with the highest benefit-to-cost ratio winning if the front end is free.

According to one embodiment, ROIs scoring higher receive a higher priority in the resource management scheme, and are afforded a higher revisit rate. This is to ensure events or information are observed and gathered more quickly, allowing for more complete search space coverage.

The coverage pattern for ROIs may include several closely spaced cell clusters, each designated as regions of interest. In this case, the adjacent cell's beams would effectively cover several regions at once, without the need to re-designate antenna jobs to cover each region individually. After the ROIs are ranked, the higher ranked ROIs coverage pattern is checked against other regions of interest. If multiple ROIs are serviced by one coverage pattern, the ROIs are combined resulting in a new, larger, distributed region.

Figure 2:
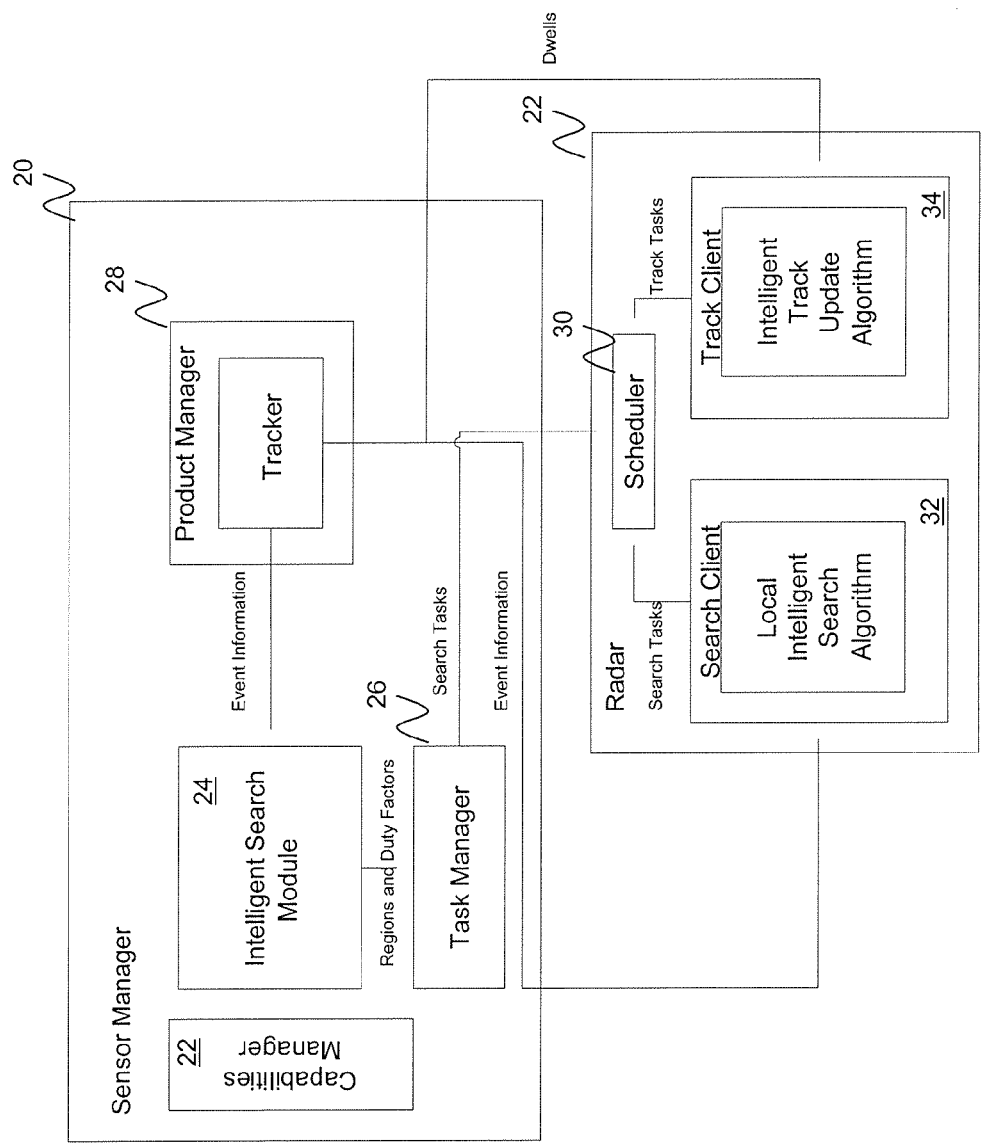
FIG. 2 is a block diagram of an autonomous wide area surveillance system included in an aerial device according to one embodiment of the invention.

FIG. 2 is a block diagram of an AWAS system included in the aerial device 14 of FIG. 1 according to one embodiment of the invention. The system includes a sensor manager 20 coupled to a radar 22. According to one embodiment, the sensor manager is a computer device having a processor and memory storing computer instructions executed by the processor for executing an intelligent search algorithm according to the various embodiments of the present invention. The sensor may be any airborne conventional sensor known in the art such as, for example, Global Hawk, Airborne Standoff Reconnaissance Radar, or the Littoral Surveillance Radar System.

According to one embodiment, the sensor manager 20 includes an intelligent search module 24 configured with an intelligent search algorithm that combines real time adaptive sensor management with closed loop techniques to reduce data loads and focus on event rich regions. In this regard, the intelligent search module 24 receives a grid of historical track data or other observations in a matrix format and processes such data to isolate regions of high activity (ROIs) and assign a coverage pattern to maximize sensor efficiency in covering such regions of high activity. The output of the intelligent search module 24 include geometries of the ROIs, coverage patterns (e.g. estimated number and position of radar dwells required, to scan the ROIs), and desired revisit rates for the ROIs.

The sensor manager further includes a capabilities manager 22, task manager 26, and product manager 28. The capabilities manager 22 is configured to maintain and manage the capabilities of the sensor, e.g. what kind of sensor is it, what operating modes exists, what is the resolution of the sensor, what is the duty cycle, etc. It also has the ability to derive capabilities and normalize capabilities. The task manager 26 is configured to interpret tasking from external and internal sources, apply policy, generate tasks for the sensor, and decompose tasking into finer jobs. The product manager 28 is configured to process collection products, store products, report products to internal and external sources and may also trigger new task generation.

The radar 22 includes a scheduler module 30, search client 32, and a track client 34. The scheduler module 30 is configured to receive the geometries of the ROIs, coverage patterns, and desired revisit rates for the ROIs. Based on such input, the scheduler module 30 determines job priorities for all search regions and schedules antenna jobs based on such priorities. The search client 32 is a semiautonomous "agent" responsible for requesting front end time to perform "search" jobs on the radar. The track client 34 is a semiautonomous "agent" responsible for requesting front end time to perform "track" jobs on the radar.

Figure 3:
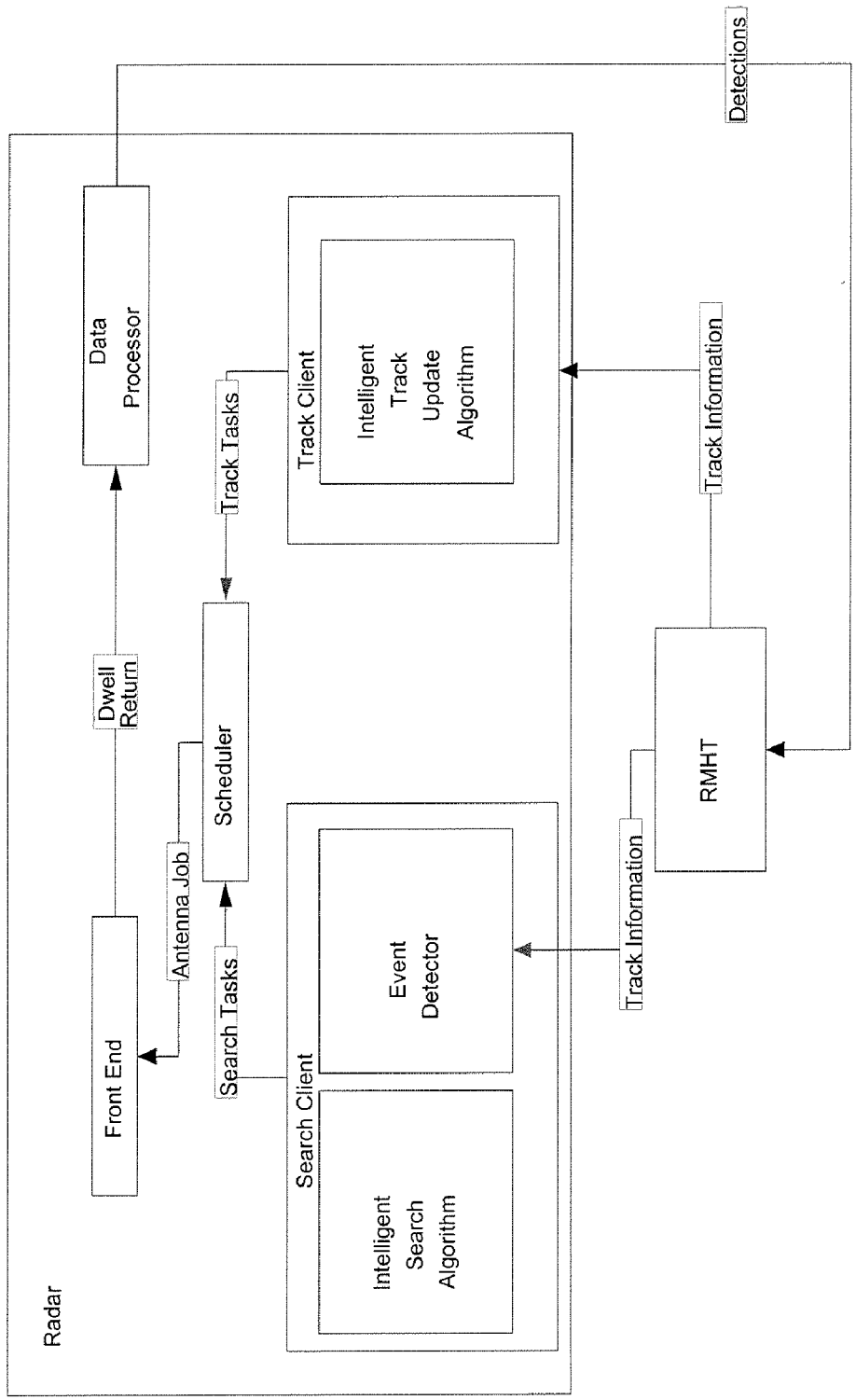
FIG. 3 is a block diagram of an autonomous wide area surveillance system integrated into a radar according to one embodiment of the invention.

In an alternative embodiment, the AWAS system may be integrated into a radar. FIG. 3 is a schematic diagram of such an alternative embodiment. The inclusion of both an intelligent search along with an intelligent track update has the potential to greatly increase situational awareness in search-while-track applications.

Event Generation

Prior to scenario start time, a wide area surveillance region is identified and input to the intelligent search algorithm. The region is then divided into 1' by 1' search cells, the center of which represents a point on the ground. The center point and extent coverage of the cell is completely characterized by a final value derived from the observation data collected on that point. These values can be thought of as representing a z-axis, with the x and y axes being physical locations on the ground corresponding to individual cells in the search region.

According to one embodiment, the intelligent search algorithm collects observation data for each of the search cells. Such data may include, for example, the number of events observed and the time of each observation.

An event generation rate $\lambda_{MLE}$ is assigned for each of the search cells. According to one embodiment, the event generation rate is a raw average of the observations over time. Using a Poisson Process model, where observations of the events can be sparse, each cell is assigned an estimated $\lambda$ value, which is derived from the following equation:

$$\lambda_{ij}^{MLE} = \frac{1}{N}\sum_{i=1}^{N}\lambda_i$$

where:
$$\lambda_{ij}^{MLE} = M_{ij}/\tau_{ij}$$

The $\lambda$, represents the observed events, M, divided by the time between observations $\tau$. The probability of detection has a direct impact on the accuracy of the $\lambda$ estimate, so having some knowledge of an area's specific probability of detection is very beneficial. The units of $\lambda$ are events per unit time.

According to an alternative embodiment, the event generation rate is a weighted average of events weighted by time between observations:

$$\overline{\lambda}_{MLE} = \sum_{ij}^{mn}\Delta t_{ij}\lambda_{ij}\bigg/\sum_{ij}^{mn}\Delta t_{ij}$$

Where:

$\overline{\lambda}_{MLE} = NewMLE$ $\Delta t = Timeperiod$

The above formula effectively weights the individual $\lambda_i$ estimates for which a longer estimate is available and removes boundary condition estimates where the individual estimates unsupported by a long history of observation data may dominate the final $\lambda_{MLE}$.

Region of Interest Identification and Coverage Pattern Generation

According to one embodiment, the computing device invokes an image processing tool to identify potential regions of interest and calculate various characteristics of each region. In this regard, the event generation rates are stored as a matrix, and the matrix is then converted into an image. This allows for image processing and edge detection filters to run on the generation rate matrix.

Figure 4:
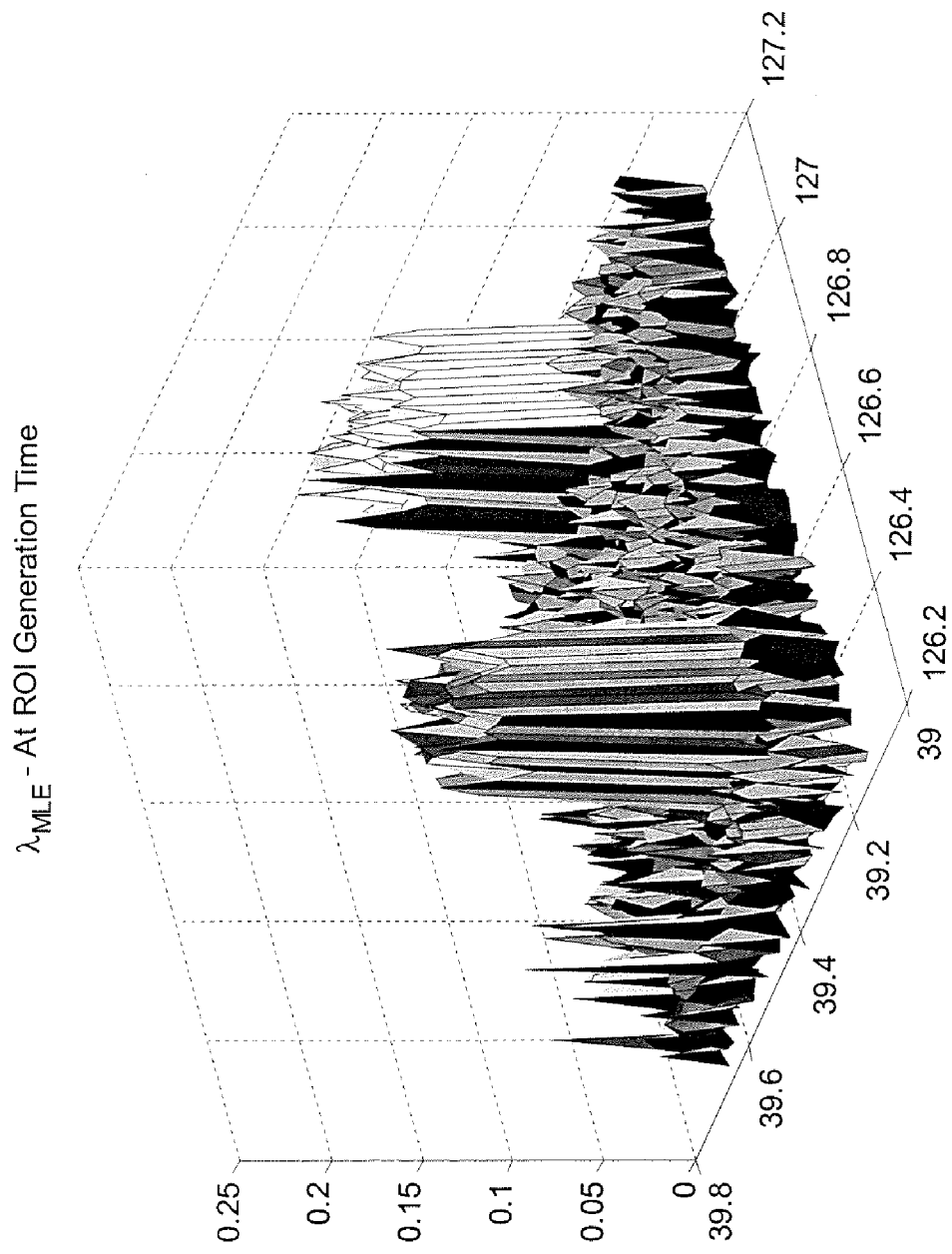
FIG. 4 is a screen shot of an image generated from a matrix of events according to one embodiment of the invention.

FIG. 4 is a screen shot of an image generated from a matrix of events according to one embodiment of the invention. In the example of FIG. 4, the degree (x-y plane) markers on the ground indicate locations. The z axis is the estimated $\lambda$ value. The two regions of high activity are easily discerned, despite no a priori knowledge applied to the algorithm.

The search space is then converted to a 2-D pixilated grayscale image, with the x-y axis representing pixel locations, and the z axis the intensity of each cell. A 2-D pillbox image filter is used to smooth out and potentially combine high activity regions, should they be sufficiently close. According to one embodiment, the filter width is a 4 cell diameter pillbox.

Figure 5:
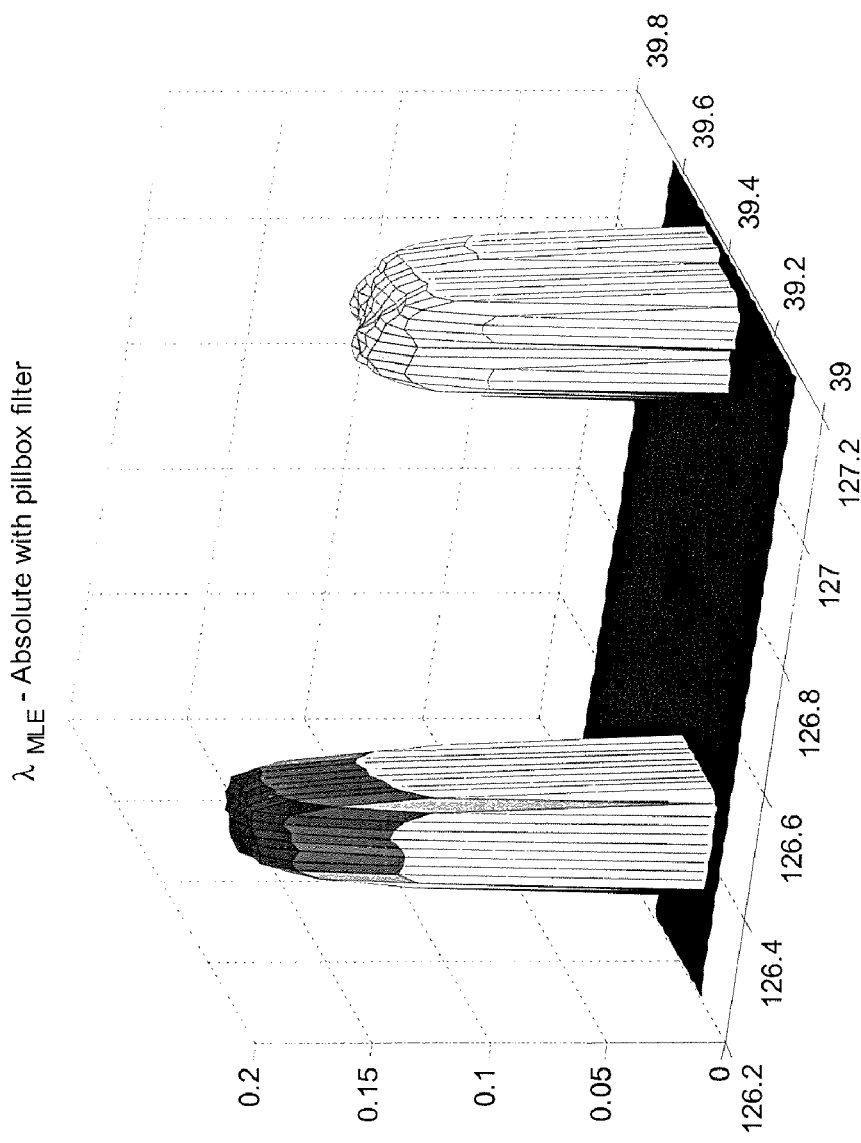
FIG. 5 is a screen shot of an image generated after processing the image of FIG. 4 through a pillbox filter.

After the smoothing, statistics are gathered on all cells, with a user input minimum percentile threshold designated as high activity regions. Despite its current manifestation as a user input, this minimum may be scaled to be a product of the search space. If, for example, a large percentage of cells in the search space are found to be above some minimum threshold, the algorithm would perform just as well at managing a time line for a disparate and distributed search space. This step can be considered a second filtering process, where the smoothed grayscale image's highest intensity points are isolated for regional image processing. FIG. 5 illustrates isolated regions after processing the cells via the pillbox filter.

Figure 6:
FIG. 6 is a screen shot for a binary black and white image generated from the image of FIG. 5 according to one embodiment of the invention.

The search space is then converted from a raster image to a binary black and white image. FIG. 6 is a screen shot of such a binary black and white image. The reasoning behind this is that image processing applications provide a suite of functions available for regional image processing on binary black and white images. After filtering the grayscale image, the pixels colored white are all considered ROIs. The corresponding pixel locations on the grayscale search space image are designated as ROIs, and their characteristics are computed through the image processing tools.

Figure 7:
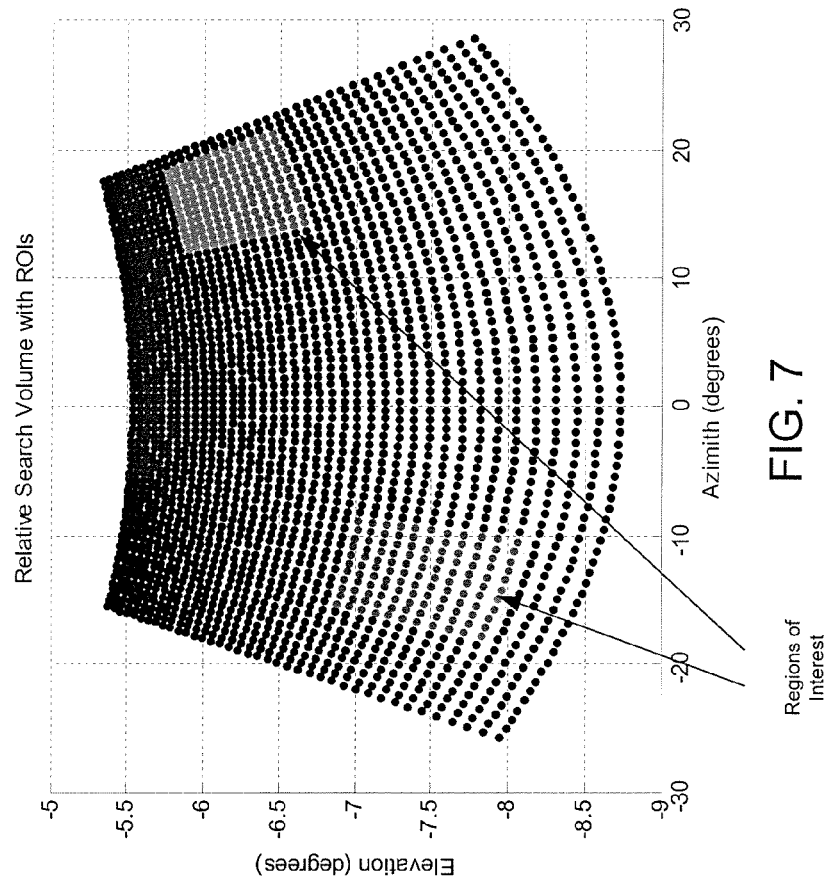
FIG. 7 is a screen shot of an exemplary search grid with two regions of interest according to one embodiment of the invention.

According to one embodiment, the white regions are cells corresponding to regions of high event generation. The cells are then mapped back into the search grid, with the regions of interest specially designated by cell value. FIG. 7 is a screen shot of an exemplary search grid with two regions of interest.

The characteristics provided are:

| Characteristic | Comment |
| --- | --- |
| List of candidate cells | Provides the indexes of all cells contained in the region |
| Region Outline | Vector outline of region. |
| Area | Area of region, in terms of the cells it encompasses. Used in ranking and pattern coverage determination. |
| Pixel Intensity | The total score (z-axis) in region, average value throughout region |

Develop a Revisit Criteria for each ROI

Given an accurate estimate of the event generation rate $\lambda$ of each cell through observation history, as well as list of characteristics for each ROI through the image processing toolbox, a near term estimate of the number of events of interest in each region can be determined.

According to one embodiment, the methodology for this calculation rests in the assumption that the likelihood of event occurrence can be modeled as a Poisson Process:

$$P_K = e^{-\lambda \tau}(\lambda \tau)^K / K!$$

where:

$P_K$=Probability of K events occuring
$\lambda$=Estimated Rate of Event occurrence
$\tau$=Period between current time and last visit
K=Number of Events (track starts/stops)

Figure 8:
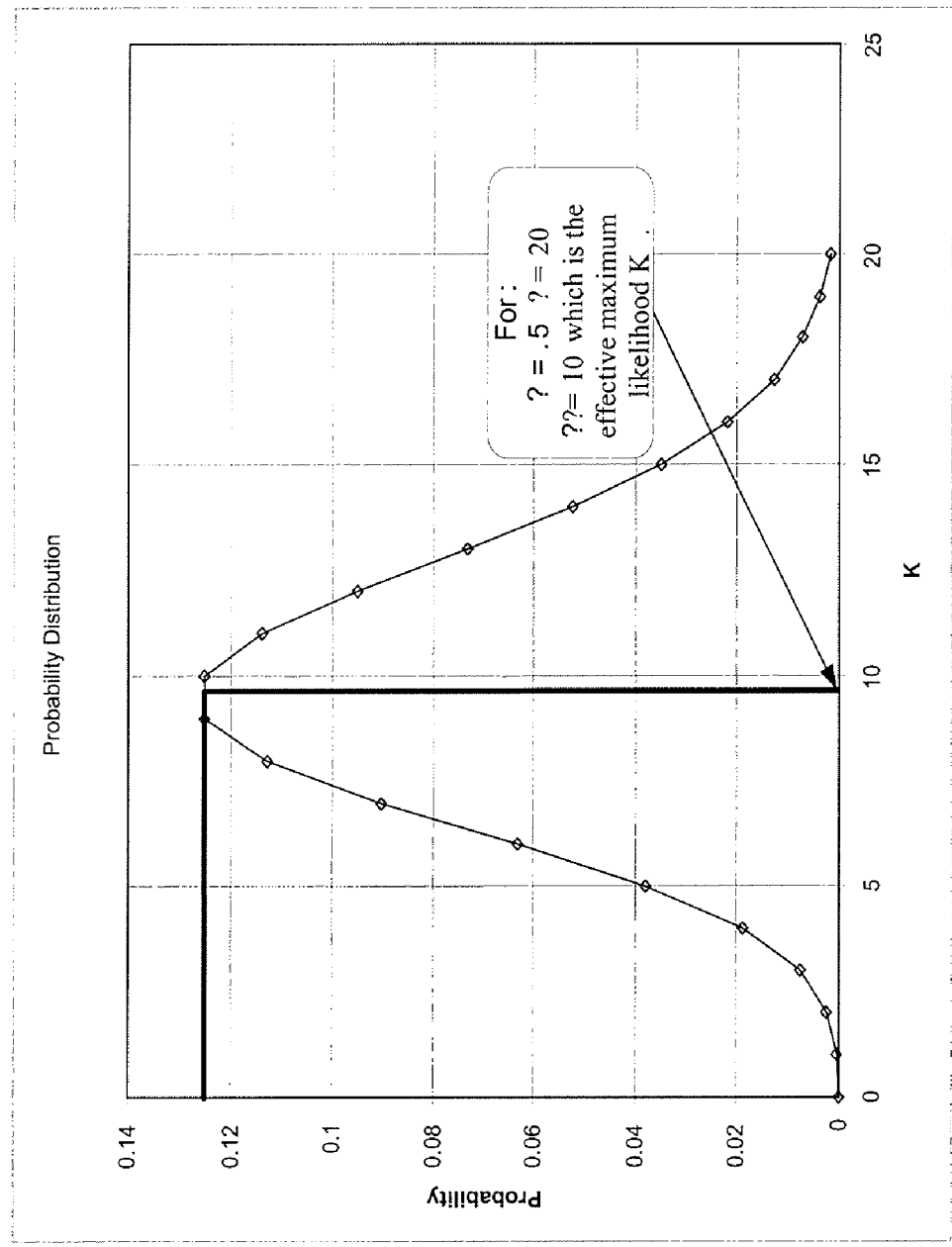
FIG. 8 is a graph depicting an exemplary most likely K estimate.

Each time the scheduler in the radar evaluates search priorities, this calculation is performed for each region (including the raster scan) in the entire WAS. The number K is varied discretely (0-N) until a maximum likelihood estimate, P_max is reached. Alternative methods for getting P_max include taking derivatives with respect to K, but given that factorials are non-continuous functions, a numeric representation using a Gamma function would be needed. The K_max for each cell is then summed up cell by cell, with K_total for each region representing the benefit of revisiting that particular region. FIG. 8 is a graph depicting an exemplary most likely K estimate.

According to this embodiment, the cost for a revisit of the region is simply a time estimate, based on the coverage pattern, i.e. how long it will take to completely scan the region. Therefore, small regions with a number of high $\lambda$ cells would produce the highest priority ranking.

$$\text{Root} = K_{MLE}/\tau$$

where:

$K_{MLE}$=total estimate of events since last scan
$\tau$=estimated time to scan region The estimated time to scan is a function of number of collection dwells to completely scan the region, multiplied by the time each dwell occupies the front end.

As the scenario continues, the estimates for $\lambda$ are continuously updated through new most likely estimates. If a cell or region does not produce a higher value after some time that cell's $\lambda$ value will be reduced, in turn reducing its K_mle, and lowering the benefit of revisiting that region.

Alternative Embodiment for Revisit Rate Determination

According to another embodiment of the invention, the search algorithm utilizes the following algorithm for revisit rate determination. Assume it takes $\tau$ seconds to complete one full scan of the search space. A time line dedicates a non-fixed amount of front end (radar) time to performing such scans, where such variable is called X. Also, assume that other clients and applications control a separate percentage of the overall front end time line, Y. To get the variable Z (the percentage of time line available for sub-region scans), the equation is as follows:

$$Z = 100 - X - Y$$

Y may be a number over which the search client has no domain control. Yet, since the search client is the primary domain controller for search applications, X and Z are configurable by the computing device to produce optimal search coverage over the entire region of interest. According to one embodiment, the computing device is configured to autonomously vary these parameters in a predictive manner to provide optimal search coverage within the region.

Consider the following equation:

$$S = X + \sum_{i=1}^{N} z_i$$

where:

$S$ = Search Duty $X$ = Raster Duty $z_i$ = Duty for $i$-th region

From the equation above, the total search duty is a sum of the allowed raster scan front end duty, and the summation of all sub-region scan front end duties. The front end search duty is a percentage of time the radar allows for search. Individually allocating these numbers while holding S as fixed allows the determination of optimal resource allocation.

Due to historical data utilized to produce a most like estimate $\lambda$, while also applying a priori knowledge of the period over which the coverage pattern will be relevant (n$\tau$—where n is a user selected integer) allows the estimating of the total number of events likely to occur during the upcoming period:

$$E_T = \sum_{ij}^{mn} n\tau \lambda_{ij}$$

Where:

$E_T$ = Events Total $n\tau$ = Designation Period $\lambda_{ij}$ = Estimated event Rate for cell $ij$ Within each sub-region, the total number of events occurring can be characterized as follows:

$$E_K = \sum_{ij}^{K} n\tau\lambda_{ij}$$

Where:

$E_k$ = Events Total in Region $K$ $n\tau$ = Designation Period $\lambda_{ij}$ = Estimated event Rate for cell $ij$ Utilizing the information in the above to equations, the percentage of time a region should be covered (a desired revisit rate) is governed by the percentage of events likely to occur during a period. Thus, the percentage of time a sub region should be covered is the percentage of unique targets each sub region scan would yield over the course of the designation period:

$$Z_K = S * E_K / E_T = S * \sum_{ij}^{K} n\tau\lambda_{ij} / \sum_{ij}^{mn} n\tau\lambda_{ij}$$

Where:

$Z_K$ = Percentage of Search Duty $S$ = Total Search Duty

After all sub region duty factors have been determined, the following equation is used to recover X, the available duty for raster scans $$X = S - \Sigma Z_K$$

The above provides the tentative duty allocation for the upcoming period. However, according to one embodiment, an efficiency check is performed before a job list is published to the scheduler. For marginal sub-regions, whose efficiency score is below that of the raster scan, the antenna jobs associated with them are removed from the active job queue, with their duty factor being reallocated to the raster scan front end duty (X), as well as the individual sub-region duties ($Z_K$). This ensures that the maximal benefit of job allocation is achieved, and the time spent scanning a sub-region yielding less targets is eliminated.

According to one embodiment, efficiency is defined as expected number of event detections divided by the expected time spent scanning the region.

Assume the following to be true:

$\tau$ = Period of 1 Raster $\tau_K$ = Period of Sub—Region scan $K$

Therefore the scan efficiency of any region can be defined as:

$$Eff_K E_K / \tau_K)$$

The units of $Eff_K$ are events observed per second spent scanning the region. According to one embodiment, the maximum allowable time for sub-region scan is a hard coded percentage of S. This number, however, could be ascertained in a more rigorous and deterministic manner utilizing statistics.

According to one embodiment, antenna jobs corresponding to sub regions are subject to the constraint that the scan efficiency of the region ($Eff_K$) must be greater than the general raster efficiency ($Eff_T$) in order to be added to the antenna job list. Any efficiency rating below the general raster efficiency ($Eff_T$) is scrubbed from the active antenna job list, and its front end request time is added to the total search front end time (S) and redistributed to the active jobs.

Improvements for Event Rate Generation

According to one embodiment, other improvements may be made to the algorithm for estimating the event generation rate $\lambda$. According to one embodiment, an exponential decay weighting factor is included in the lambda estimate. Utilizing the current period weight, further weighted by a function which exponentially decreases as the estimate becomes older provides an apparatus where the newest and longest estimates dominate the current most likely estimate.

Another alternative to a time weighted $\lambda$ state estimate is utilizing Kalman filtering for lambda estimation. The fact that a Kalman filter is a single state estimator means that only one state estimate need be kept, rather than a history. Using an updated variance estimate as a residual weight would be beneficial, and allow the system to self correct quickly based on the confidence of the current estimate.

Another benefit is using a Kalman filter to estimate $\lambda$ is that the algorithm would now have an predictive capability for the activity rates in the cells. For instance, for cells whose activity rate is still relatively high, but decreasing rapidly, lowering the priority for these regions based on this estimate could be possible and therefore resource saving.

Adaptation to Evolving Scenarios

According to one embodiment, in order to adapt to an evolving search space, the search algorithm performs periodic rechecks of the search space. After an equivalent specific integer number of raster scan times have elapsed, the designation is forced. This amounts to a forced re-designation at a regularly scheduled interval ($n\tau$—as discussed previously). In this manner, coverage pattern is dynamic and adjusts itself to a changing search space.

According to another embodiment, a statistical similarity test is employed similar to those used with image recognition applications. This provides a "break-loop" condition where an emergency re-designation can be forced if the search space changes in a sudden and dramatic fashion.

Below is the equation utilized as the metric based test of such a condition.

$$Regen = \sqrt{\sum_{ij}^{mn} [I_C(i,j) - I_N(i,j)]^2 / \sum_{ij}^{mn} [I_N(i,j)]^2}$$

Where:

$I_C$ = CurrentMapEstimate $I_N$ = NewestMapEstimate

For example, if the above equation yields a score of 0.2, it is equivalent to the stored image being roughly 20% different than the most current estimate. This would trigger a force re-designation of regions of interest, and serve as a "break-loop" rule.

AWAS Flow Descriptions

Figure 9:
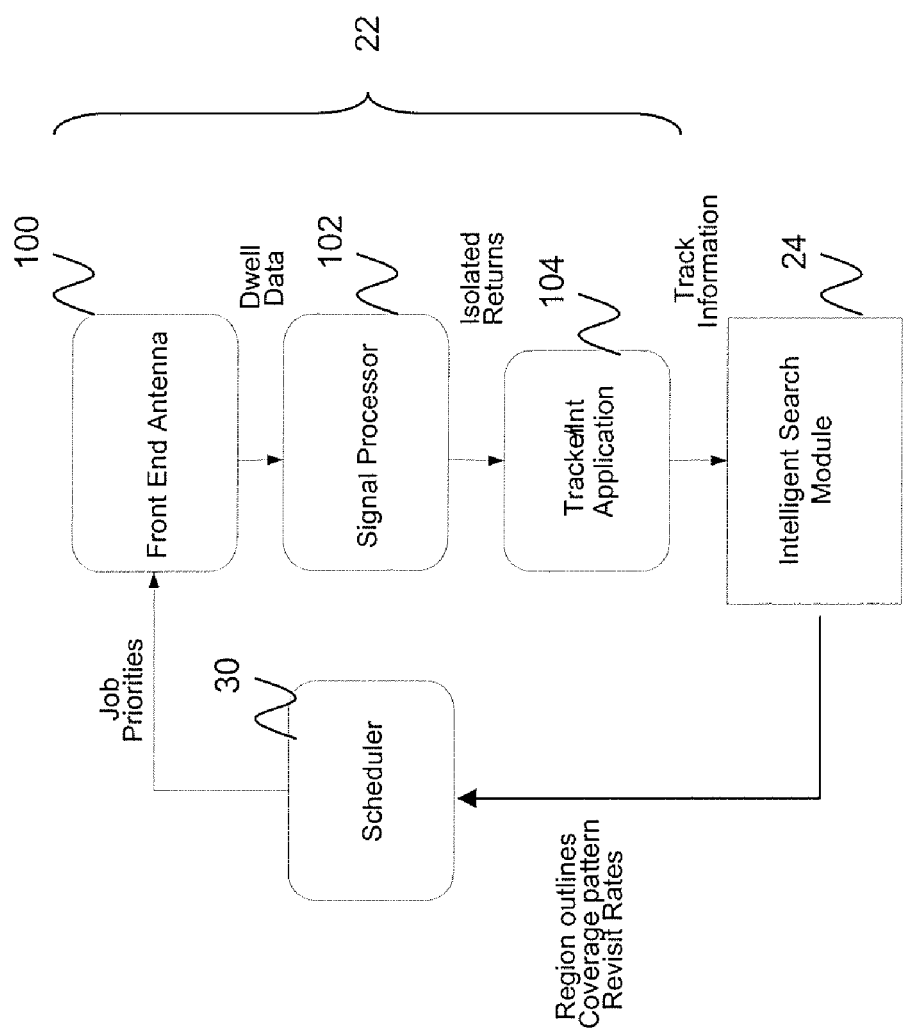
FIG. 9 is a diagram depicting the flow of data from one component to another to achieve a closed-loop process for an autonomous wide area surveillance according to one embodiment of the invention.

FIG. 9 is a diagram depicting the flow of data from one component to another to achieve a closed-loop process for autonomous wide area surveillance according to one embodiment of the invention. A front end antenna 100 associated with the radar 22 scans a geographic search region and provides dwell data to a signal processor 102. Dwell data may include, for example, Raw IQ data as well as Analog to Digital outputs. The signal processor 102 processes the dwell data and outputs contact information, pointing angles, and waveform information to a tracker/intelligence application 104. The tracker/intelligence application 104 then supplies the observed events to the intelligent search module 24.

The intelligent search module receives the observation data from the tracker/intelligence application 104. It then determines a coverage pattern and revisit rates for the regions of interest and transmits such information as a series of search requests to the radar's scheduler 30. The scheduler 30 uses the input information to determine the relative priority of each search request in relation to other jobs, and configures the front end antenna 100 accordingly. This then completes a single loop of the search process. The front end antenna 100 then proceeds to conduct a more focused scan of the regions of interest based on the desired revisit criteria. The scan results may be output to, for example, a user, via an output device for analysis. The scan results may also be stored in a memory, displayed on a monitor, and/or printed.

Figure 10:
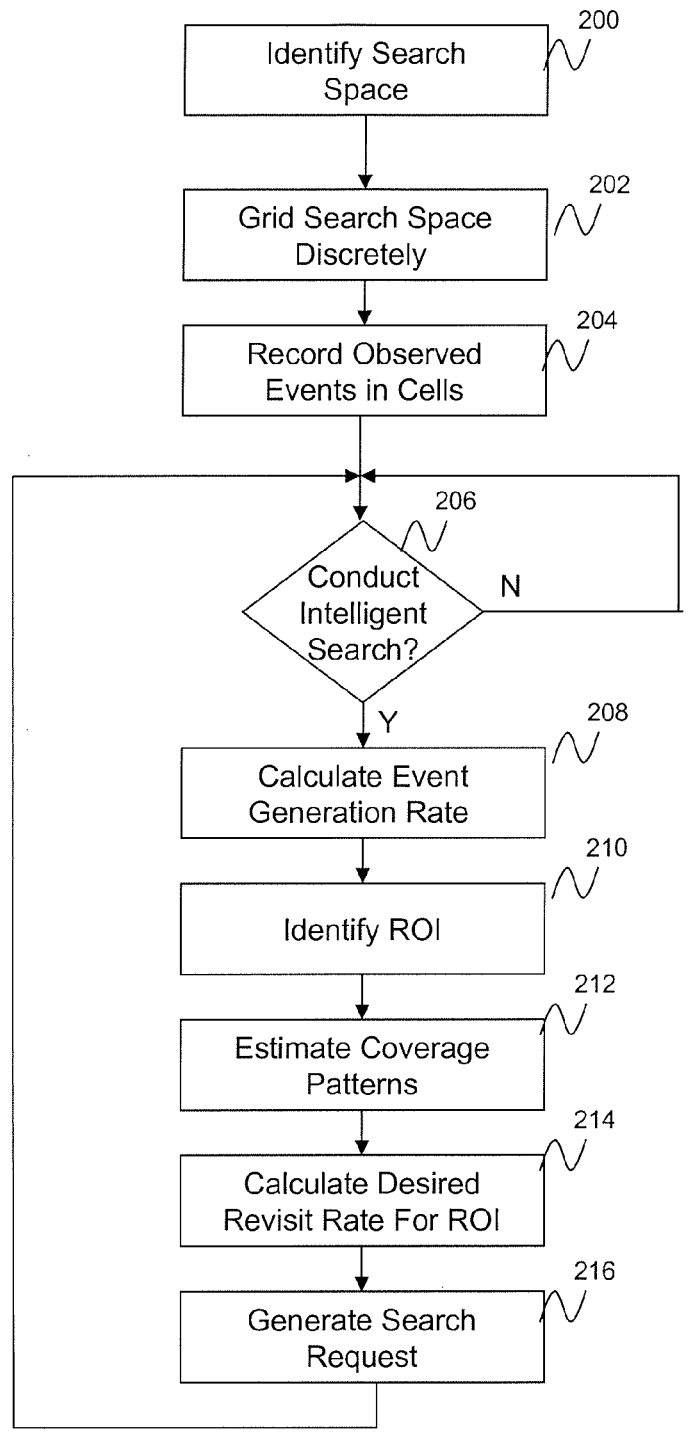
FIG. 10 is a flow diagram of an algorithm executed by an intelligent search module according to one embodiment of the invention.

FIG. 10 is a flow diagram of an algorithm executed by the intelligent search module 24 according to one embodiment of the invention.

In step 200, the intelligent search module identifies a desired search space. In this regard, the module takes as input corner box information (rectangular grid size), suggested revisit rate, as well as mission priorities which may be entered via a user via an input device (e.g. keyboard) coupled to the computing device.

In step 202, the intelligent search module grids the search space into various search cells. For example, the search space volume may be broken up into cells spanning 1 arc minute each.

In step 204, the intelligent search module records observed events in the search cells. In this regard, an event of interest (e.g. track source location or track sink location) is recorded as an observation. This may include, for example, a number of events observed, and a time and true ground locations for the observations. A person of skill in the art should recognize that observations may relate to any type of behavior and may expand to any sensor or group of sensors that is integrated with a tracker/sensor manager, or at the very least, a programmable event detector, and are not limited to track sources and/or sinks. According to one embodiment of the invention, the events are represented as a matrix for processing.

In step 206, the intelligent search module determines whether an intelligent search should be conducted. The intelligent search may be conducted, for example, at discrete intervals where the determination may include determining whether a set time interval has elapsed since the last intelligent search. According to one embodiment, the period is non-deterministic and may be a user input variable.

The intelligent search may also be conducted if a break-loop condition is met. According to one embodiment, a break-loop condition may be defined in order to force a re-designation of the regions of interest. The break-loop condition may specify that if the intelligent search module detects a difference between the grid used to generate the current coverage pattern is 20% different in relative value to the most current estimate, a re-designation is forced.

If an intelligent search is to be conducted, the intelligent search module calculates an event generation rate in step 208 for each of the search cells based on the collected observation data. According to one embodiment of the invention, the event generation rate is an average of events, individually weighted by the time between observations. In alternative embodiments, the event generation rate may be simply a raw average of the events over time.

In step 210, the intelligent search module identifies one or more ROIs. In this regard, the event generation rates estimated for the search cells are first clustered and filtered using a pillbox image smoothing filter. According to one embodiment, the search cells are then filtered statistically, keeping, for example, only the 1-$\sigma$ band and higher. This is then converted to a gray-scale image for further processing. The high activity regions with event generation rates above a set minimum threshold are then clustered together, and the non-zero scoring cells are converted to a binary black and white image. An object edge detection filter may be used to identify the regions.

In step 212, the intelligent search module generates an antenna coverage pattern for each sub-region as well as the entire region. The coverage pattern may include geometries of the scan for each of the sub-regions and may depend on the type of sensor involved. The geometries may include, for example, the outline of the sub-region on the ground.

In step 214, the intelligent search module calculates a revisit criteria for the identified ROIs. The revisit criteria includes a desired revisit rate for scanning the ROIs. According to one embodiment, a revisit rate is the inverse of the desired time between scans (scan period), or can alternatively be derived from the amount of front end 22 time a sub-region occupies (given knowledge of the coverage pattern). The relationship between a coverage pattern and a revisit criteria is that a coverage pattern provides physical characteristics of the antenna job (where to point, list of ground positions, etc) while the revisit rate criteria (desired front end loading) is used by the scheduler 30 to determine the relative priority of the scan (revisit actual vs. revisit desired).

In calculating the desired revisit rate for a ROI, the intelligent search module uses the event generation rate and the knowledge of the re-designation interval to estimate the amount of activity in each ROI as well as the entire region. According to one embodiment, the revisit rate for an ROI is determined by the amount of events expected to occur within the ROI, relative to the rest of the grid. For instance, if 20% of new targets in the next search cycle are expected to appear in sub-region A, then the cells comprising sub-region A are assigned a revisit rate such that the front end dedication is roughly 20% more than the surrounding cells.

According to one embodiment, the intelligent search module uses the raster scan efficiency rate as a baseline and checks the efficiency (events/time needed to scan) to remove any designated ROIs whose efficiency rating fall below that of a raster scan of the entire region. The intelligent search module then uses the knowledge of front end time available for performing searches to assign front end duties to the raster scans and ROI scans. The denser regions are configured to receive higher duty factor scores due to a low scan time and a high estimated event generation rate.

In step 216, the intelligent search module generates a search request to be sent to the scheduler 30. According to one embodiment, the search request includes desired revisit rates for the ROIs and calculated coverage patterns for all sub-regions. Sending the search request to the scheduler represents a final step in a single loop. The process then continues at either designated intervals or if a break loop condition is met.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for wide area surveillance of a geographic region comprising:
    identifying by one or more computer processors a search space associated with a geographic region having a plurality of sub-regions;
    dividing by the one or more computer processors the search space into a plurality of search cells;
    collecting by the one or more computer processors observation data for each of the plurality of search cells based on a scan of the geographic region;
    calculating by the one or more computer processors an event generation rate for each of the search cells based on the collected observation data;
    identifying by the one or more computer processors one or more of the sub-regions as one or more regions of interest based on the calculated event generation rates;
    estimating by the one or more computer processors a coverage pattern for each of the one or more regions of interest;
    calculating by the one or more computer processors a desired revisit rate for each of the one or more regions of interest based on the estimated coverage pattern; and
    outputting by the one or more computer processors the desired revisit rate for scanning the corresponding region of interest.

2. The method of claim 1, wherein the coverage pattern defines geometries of the scan for each of the one or more regions of interest.

3. The method of claim 1, wherein the desired revisit rate includes a desired percentage of an available search time dedicated by a radar for scanning the corresponding region of interest.

4. The method of claim 3, wherein the desired percentage is based on a percentage of events likely to occur in the corresponding region of interest during a period.

5. The method of claim 4, wherein the desired revisit rate increases as the percentage of events likely to occur increases.

6. The method of claim 1, wherein calculating the desired revisit rate includes calculating a scan efficiency for the corresponding region of interest.

7. The method of claim 1 wherein the observation data includes a number of events observed for each of the search cells.

8. The method of claim 1, wherein the event generation rate is weighted average of events weighted by time between observations.

9. The method of claim 1 wherein the identifying the one or more sub-regions as one or more regions of interest includes:
    filtering the plurality of search cells based on the event generation rates; and
    clustering one or more of the search cells with event generation rates above a set minimum threshold.

10. The method of claim 1 further comprising:
    detecting a change in the region; and
    automatically invoking a new scan of the geographic region based on the detected change.

11. The method of claim 1 further comprising:
    storing the event generation rates as a matrix; and
    converting the matrix of event generation rates into an image.

12. A computing device for wide area surveillance of a geographic region comprising:
    a processor; and
    an electronic storage device coupled to the processor and including program instructions therein, the processor being operable to execute the program instructions, the program instructions including:
        identifying a search space associated with a geographic region having a plurality of sub-regions;
        dividing the search space into a plurality of search cells;
        collecting observation data for each of the plurality of search cells based on a scan of the geographic region;
        calculating an event generation rate for each of the search cells based on the collected observation data;
        identifying one or more of the sub-regions as one or more regions of interest based on the calculated event generation rates;
        estimating a coverage pattern for each of the one or more regions of interest;
        calculating a desired revisit rate for each of the one or more regions of interest based on the estimated coverage pattern; and
        outputting the desired revisit rate for scanning the corresponding region of interest.

13. The computing device of claim 12, wherein the coverage pattern defines geometries of the scan for each of the one or more regions of interest.

14. The computing device of claim 12, wherein the desired revisit rate includes a desired percentage of an available search time dedicated by a radar for scanning the corresponding region of interest.

15. The computing device of claim 14, wherein the desired percentage is based on a percentage of events likely to occur in the corresponding region of interest during a period.

16. The computing device of claim 15, wherein the desired revisit rate increases as the percentage of events likely to occur increases.

17. The computing device of claim 12, wherein calculating the desired revisit rate includes calculating a scan efficiency for the corresponding region of interest.

18. The computing device of claim 12, wherein the observation data includes a number of events observed for each of the search cells.

19. The computing device of claim 12, wherein the event generation rate is weighted average of events weighted by time between observations.

20. The computing device of claim 12 wherein the program instructions for identifying the one or more sub-regions as one or more regions of interest includes program instructions for:
    filtering the plurality of search cells based on the event generation rates; and
    clustering one or more of the search cells with event generation rates above a set minimum threshold.

* * * * *